G. JAYME.
METHOD OF REMOVING SCALE FROM BOILERS.
APPLICATION FILED JULY 21, 1914.
1,139,873.
Patented May 18, 1915.
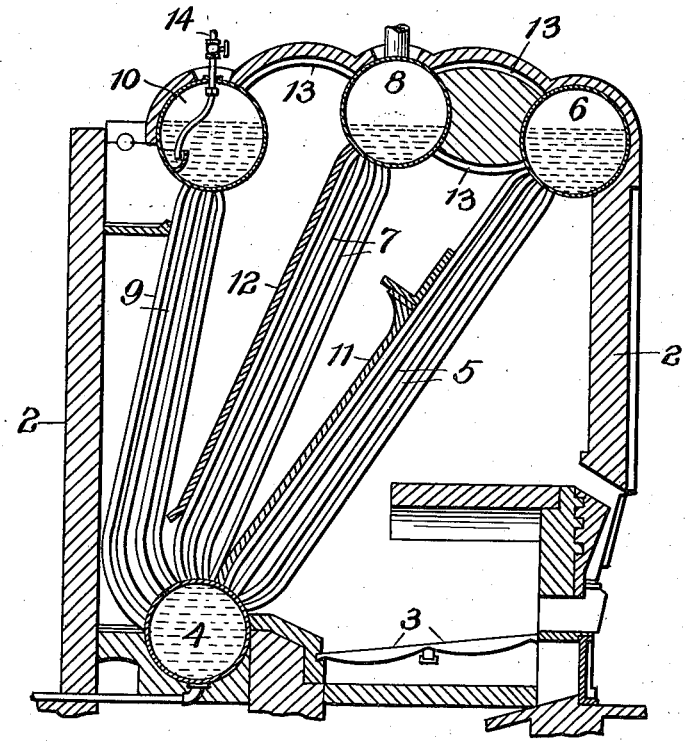
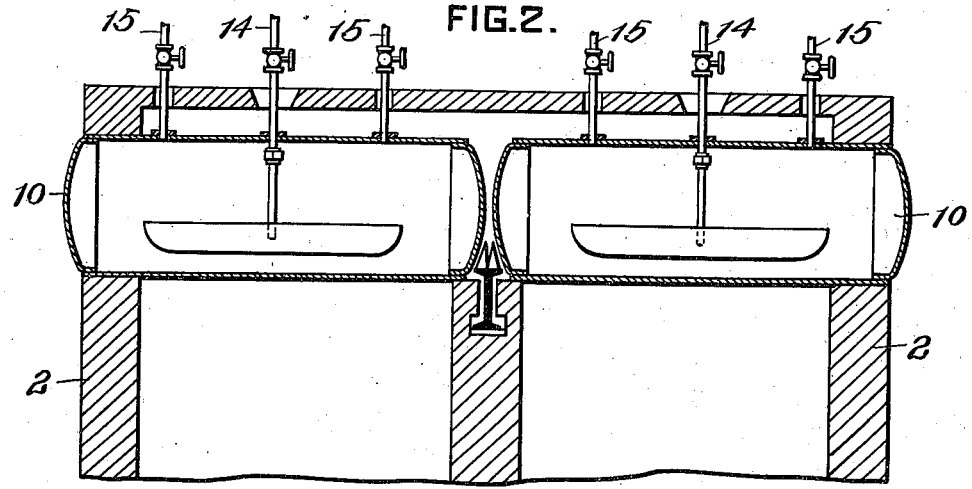
WITNESSES
S. F. Armstrong.
John F. Will.
INVENTOR
George Jayme
By Kay Totten Powell
Attys

UNITED STATES PATENT OFFICE.

GEORGE JAYME, OF PITTSBURGH, PENNSYLVANIA.

METHOD OF REMOVING SCALE FROM BOILERS.

1,139,873. Specification of Letters Patent. Patented May 18, 1915.

Application filed July 21, 1914. Serial No. 852,281.

*To all whom it may concern:*

Be it known that I, GEORGE JAYME, a citizen of the United States, and resident of Pittsburgh, in the county of Allegheny and State of Pennsylvania, have invented a new and useful Improvement in Methods of Removing Scale from Boilers; and I do hereby declare the following to be a full, clear, and exact description thereof.

My invention relates to method of removing scale from boilers.

The object of my invention is to provide a simple and efficient method by means of which the scale or incrustation in boilers may be removed and the boiler restored to its original efficiency in the development of steam.

The invention consists, generally stated, in introducing a mixture of crude-oil and kerosene in proper proportion into the boiler, then introducing water and as the water rises the oil floats on the same, coats the tubes, and attacks the scale. Steam is then introduced at the upper end of the boiler to agitate the fluid and cause a thorough mixture so that the scale at all points will be reached and acted on by the mixture.

In the accompanying drawings, I have illustrated in Figure 1 a sectional view of a boiler of the Stirling type; and Fig. 2 is a longitudinal sectional view of the upper end taken through the drums.

The numeral 2 designates the furnace-walls; 3 the grate-bars of the fuel-chamber, 4 the lower-drum, 5 the bank of the tubes connecting the lower-drum with the upper-drum 6, 7 the bank of tubes connecting the lower-drum with the middle drum 8, and 9 the bank of tubes connecting the lower-drum with the upper-drum 10.

Suitable baffles 11 and 12 are employed.

The upper-drums are connected by the pipes 13 in the usual manner.

The water is admitted to the boiler by the pipe 14 and steam is admitted by pipes 15.

In the operation of removing the scale, I first introduce into the boiler a composition composed of crude-oil and kerosene in proper proportions according to the character and condition of the scale to be removed, and prefer to add a portion of pulverized graphite. For ordinary purposes, I use 1½ gallons of crude oil, 1½ gallons kerosene and ½ pound of pulverized graphite. This mixture is introduced in the lower-drum 4 before the water is introduced. The water, heated preferably to about 190° is introduced, the oil being lighter than water will rise to the top of same, and as the water rises in the tubes, the mixture floating on top will coat the walls of the tubes and attack the scale. When the boiler is almost full of water, the mixture will be floating on the top of same, and in order to mix the mixture thoroughly with the water and so provide for reaching all parts of the boiler and the scale at all points, I provide for the agitation of the liquid, and this I accomplish by the introduction of steam at proper pressure through the pipes 15. Steam is introduced at from 100 to 135 pounds by the pipes 15, and this steam may be turned in from another boiler or from the main steam-header. This introduction of the steam will act to agitate the water and mix the oil thoroughly therewith, causing a circulation and thereby reaching all points in the boiler. This agitation may be kept up several hours, and after this agitating operation, the liquid is allowed to stand for about a period of forty-six (46) hours to permit the mixture to soak in and attack and soften the scale. In many instances, after such a period, it will only be necessary to open the blow-off valve and by the introduction of water at about 200 pounds pressure, the scale will be removed. If, however, the scale adheres, it can be readily removed by a Dean hammer or other device where it is very hard and thick.

As a preventive, the above method may be employed from time to time when the boiler is in operation without cutting the boiler out of service, and in this case a smaller quantity of the mixture will do the work.

What I claim is:

The method of removing scale from boilers, consisting in introducing into the lower end of the boiler a mixture of crude-oil and kerosene, introducing water, raising the oil by the introduction of the water, and introducing steam at the upper end of the boiler to agitate the liquid.

In testimony whereof, I the said GEORGE JAYME have hereunto set my hand.

GEORGE JAYME.

Witnesses:
ROBT. D. TOTTEN,
JOHN F. WILL.